United States Patent Office.

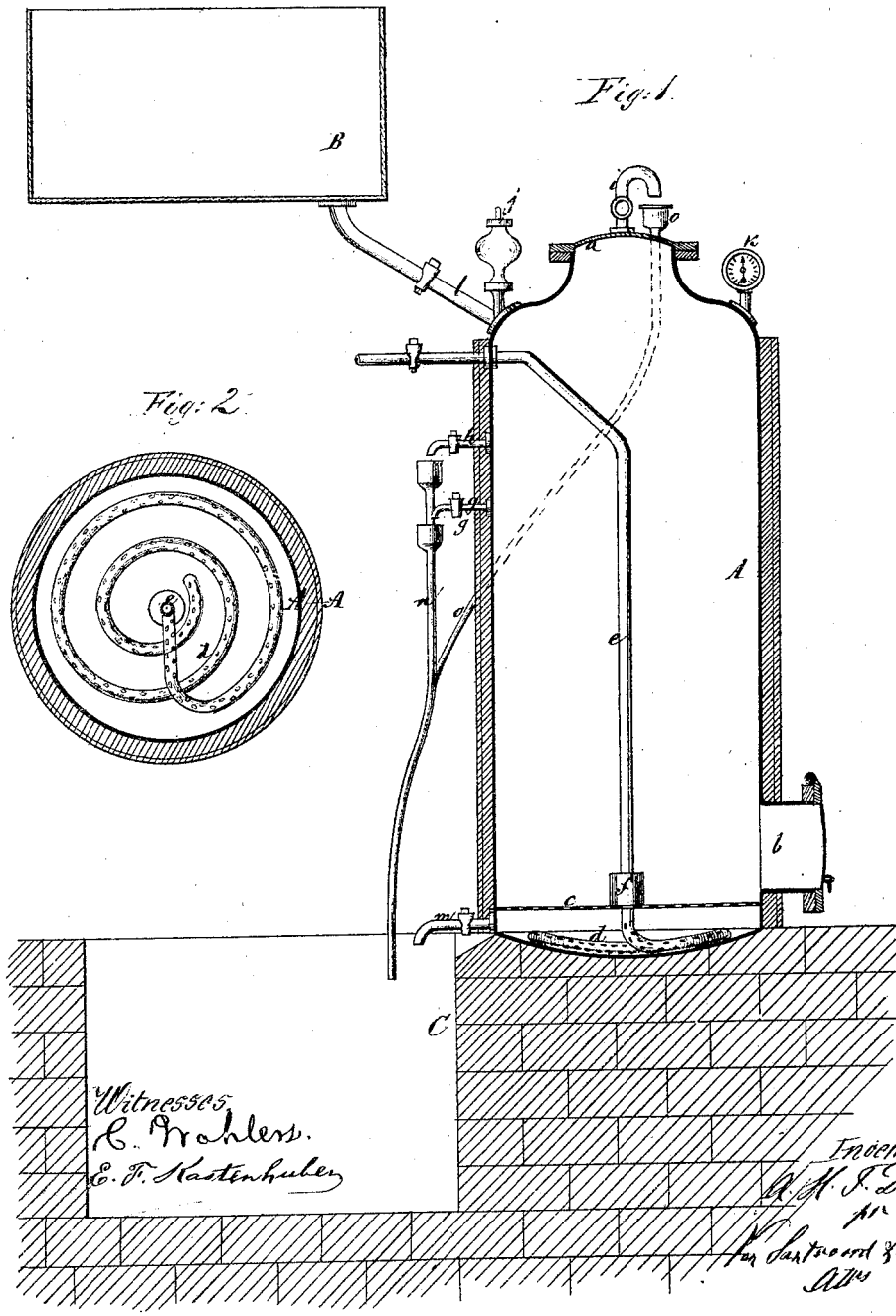

AUGUST HERMANN FRANZ DEININGER, OF BERLIN, PRUSSIA.

Letters Patent No. 108,241, dated October 11, 1870.

IMPROVEMENT IN DISINTEGRATING FIBROUS MATERIALS FOR PAPER-PULP, &c.

The Schedule referred to in these Letters Patent and making part of the same.

*To all whom it may concern:*

Be it known that I, AUGUST HERMANN FRANZ DEININGER, of Berlin, in the Kingdom of Prussia, have invented a new and useful Improvement in Disintegrating Fibrous Materials; and I do hereby declare the following to be a full, clear, and exact description thereof, which will enable those skilled in the art to make and use the same, reference being had to the accompanying drawing forming part of this specification, in which drawing—

Figure 1 represents a vertical section of the apparatus used in carrying out this invention.

Figure 2 is a horizontal section of the same.

Similar letters indicate corresponding parts.

This invention consists in exposing fibrous materials, such as wood or any vegetable substance, to the action of an alkaline solution under superatmospheric pressure, (about sixty pounds to the square inch,) and at a temperature not exceeding 212° Fahrenheit, in such a manner that, by the combined action of the pressure and the heat, the fibrous material is split and disintegrated without destroying the fibers by overheating or by the chemicals, the formation of steam in the interior of the disintegrating-vat being prevented, and the alkaline solution used being weak, and not in any way injurious to the fibers.

The apparatus which I use in carrying out this process consists in a vat, which can be hermetically closed, and which is provided with a false perforated bottom, under which is situated a perforated coil, which connects with a steam-generator.

A check-valve prevents the contents of the disintegrating-vat from being forced into the steam-generator, and a thermometer, a pressure-gauge, and suitable try-cocks in the side and on the top of said vat enable the operator to regulate the operation, and, particularly, to insure the proper filling up of the vat, and to control the temperature of the same.

In the drawing—

The letter A designates a vat, made of sheet metal, or of any other suitable material, of sufficient strength to contain, without danger, an internal pressure of sixty pounds to the square inch.

Said vat is provided on top with a cover, *a*, which can be screwed down air-tight, and it is also furnished with an aperture, *b*, near its bottom, which can be closed air-tight by a suitable plate, and which serves to withdraw the contents of the vat.

Said vat is provided with a false perforated bottom, *c*, and under this bottom is situated a perforated coil, *d*, which connects, by a pipe, *e*, with a steam-generator.

A check-valve, *f*, prevents the contents of the vat from being forced into the steam-generator.

In the sides of the vat are two gauge-cocks, *g h*, for the purpose of controlling, with the aid of the thermometer and pressure-gauge, the temperature, and also the pressure of the liquid in the vat, and in the top of said vat is secured a try-cock, *i*, for the purpose of allowing an escape of the air contained in the vat, and also to observe if the vat is properly filled, and if any steam has been formed in the interior of said vat.

A thermometer, *j*, serves to regulate the temperature, and a pressure-gauge, *k*, allows of controlling the pressure in the interior of the vat.

Said vat connects at its top, by a pipe, *l*, with a tank, B, and it is provided with a faucet, *m*, below its false bottom, to draw off the liquid contained therein.

Suitable pipes, *n o*, carry the liquid, drawn off by either of the cocks, down into the receiving-tank C.

In applying my process to straw or other fibrous material, for the purpose of producing paper-pulp, I proceed as follows:

In the tank B, I form a solution of soda, in water, of about 1° Baumé, and heat the same to about 175°. The straw or other fibrous material, without requiring any cleaning or assorting, is cut up into pieces about one-fourth to one-half inch long, and then introduced into the disintegrating-vat. The pipe *l* is opened, and the raw material is steeped with lye. In a short time, the raw material absorbs a quantity of the lye, and it sinks down in the tank, the surplus lye is drawn off, a fresh supply of raw material is introduced and steeped with lye, and this operation is repeated until the vat A is filled with steeped raw material up to its mouth. (My experience shows that it requires about one pound of soda to ten pounds of raw material.) After it is found, by opening the cock *i*, that all the air has been driven out of the vat, the pipe *e* is opened, and steam is admitted until the pressure in the vat reaches about sixty pounds to the square inch. By the action of the steam, the temperature of the contents of the vat is raised from 175 to about 210°, and the vat is kept at this temperature, and under the above-named pressure, for from four to six hours, care being taken that no steam shall form in the interior of the disintegrating-vat, and that the temperature shall remain as near as possible at a uniform point, which is easily effected by means of the thermometer and by the cocks *g* and *h*.

By the combined action of the heat and pressure, the silicic acid, the chlorophyl, and a portion of the gelatine are dissolved, and the horny scale, the marrowrays, and the knots of the raw material are softened and split by a very weak alkaline solution, while the cellular texture remains intact, whereas, in the various processes heretofore used for disintegrating fibrous materials, strong lyes and high temperatures are considered essential, and thereby the texture of the fibers is destroyed, and the fibers are charred and browned.

When treated according to my process, the fiber obtained is nearly white, and can be readily bleached and used for the manufacture of paper. This purpose I effect by removing the fibrous material from the disintegrating-vat, and exposing it to a washing process in a suitable drum. During this process, the fibers are separated, and, after having been washed, they can readily be reduced to pulp with comparatively little expenditure of power.

The yield of pulp is about ninety per cent. of the raw material.

For the purpose of bleaching, the pulp is spread upon a floor to the depth of from two to three feet, and moistened with diluted sulphuric acid of about $\frac{1}{2}°$ Baumé. In this state, it is left for two or three days, and during this time the acid combines with the coloring-matter and gelatine still present, so that the acid reaction ceases.

The bleaching-liquid is prepared by making a solution of chloride of lime, in water, of $4°$ Baumé, and, after the clear liquid has been drawn off, it is treated with soda (using about one-fourth, by weight, of the chloride of lime) until all the lime is precipitated, it being essential to prevent any free lime from coming in contact with the gelatine and silicic acid, since the same adheres to the fibers, and renders the bleaching process exceedingly difficult.

By the addition of soda, as above stated, I obtain a solution of hypochlorite of soda, which is brought in contact with the pulp, the action of the liquid being facilitated by imparting to the mass a revolving motion in a suitable drum, and by admitting a sufficient quantity of steam to raise the temperature to about $96°$. By the heat, the pulp remains soft, the bleaching action becomes uniform, and the bleaching-liquid is completely spent.

The yield of bleached pulp is from seventy-five to eighty per cent. of the raw material.

My process can also be used with advantage for producing fibers capable of being spun from various plants, such as nettles, thistles, broom-corn, rhamie, and so forth. The process in this case is substantially the same as above stated. The stalks of the plants are cut up into pieces of suitable length, (say three or four inches,) and steeped in the disintegrating-vat with an alkaline solution of $2°$ Baumé. After the disintegrating-vat has been filled with the steeped raw material, steam is admitted, and a pressure of sixty pounds to the square inch is maintained in said vat for about eight hours, care being taken to keep the temperature uniformly at from $210$ to $212°$.

In treating plants where the wood fiber appears conjointly with the bast fiber, such, for instance, as broom-corn, the strength of the alkaline solution has to be increased to $3°$ Baumé, and the steeped material has to be kept in the disintegrating-vat under pressure for twelve hours, so as to separate the wood fiber from the bast fiber.

The fiber obtained by my process from urticaceous and papilionaceous is superior in durability to cotton, and, after having been bleached, they assume a more brilliant white color than cotton, being equal in every respect to linen or hemp.

What I claim as new, and desire to secure by Letters Patent, is—

1. The within-described process of disintegrating vegetable fibrous material, by subjecting the same to the action of a weak alkaline solution, under a superatmospheric pressure, and at a temperature of not more than $212°$, so as to avoid the formation of steam in the disintegrating-vat, substantially as herein set forth.

2. The within-described apparatus for treating fibrous materials under superatmospheric pressure.

AUGUST DEININGER.

Witnesses:
FRIED. HOFFMANN,
FRIED. JAENISKE.